(12) United States Patent
Levan

(10) Patent No.: US 7,796,943 B2
(45) Date of Patent: Sep. 14, 2010

(54) SUB-SURFACE COMMUNICATIONS SYSTEM AND METHOD

(75) Inventor: David O. Levan, Manlius, NY (US)

(73) Assignee: Lockheed Martin Corporation, Bethesda, MD (US)

( * ) Notice: Subject to any disclaimer, the term of this patent is extended or adjusted under 35 U.S.C. 154(b) by 688 days.

(21) Appl. No.: 11/729,344

(22) Filed: Mar. 28, 2007

(65) Prior Publication Data
US 2008/0240209 A1 Oct. 2, 2008

(51) Int. Cl.
H04B 13/02 (2006.01)

(52) U.S. Cl. .......................... 455/40; 455/39; 455/41.1; 455/41.2; 455/561; 455/562.1; 455/67.11; 455/67.13; 455/63.1; 455/296; 455/307; 324/344; 324/345; 324/347

(58) Field of Classification Search ............. 455/39–40, 455/41.1–41.3, 561, 562.1, 67.11, 67.13, 455/63.1, 296, 307; 324/323, 344, 345–365, 324/376–377
See application file for complete search history.

(56) References Cited

U.S. PATENT DOCUMENTS

| 4,030,032 | A |  | 6/1977 | Wheeler |  |
|---|---|---|---|---|---|
| 4,611,212 | A | * | 9/1986 | Lee | 342/351 |
| 5,771,438 | A |  | 6/1998 | Palermo et al. |  |
| 6,204,817 | B1 |  | 3/2001 | Edvardsson |  |
| 6,263,189 | B1 |  | 7/2001 | Reagor |  |
| 6,359,871 | B1 |  | 3/2002 | Chung et al. |  |
| 6,670,813 | B2 | * | 12/2003 | Strack | 324/323 |
| 6,963,301 | B2 | * | 11/2005 | Schantz et al. | 342/125 |
| 7,043,204 | B2 |  | 5/2006 | Reagor et al. |  |
| 7,050,831 | B2 |  | 5/2006 | Meiksin et al. |  |
| 7,298,314 | B2 | * | 11/2007 | Schantz et al. | 342/125 |
| 7,504,829 | B2 | * | 3/2009 | Watts | 324/337 |
| 7,565,245 | B2 | * | 7/2009 | Andreis et al. | 702/7 |
| 7,592,814 | B2 | * | 9/2009 | Andreis | 324/365 |
| 2004/0214642 | A1 |  | 10/2004 | Beck |  |
| 2005/0281347 | A1 |  | 12/2005 | Li |  |

FOREIGN PATENT DOCUMENTS

GB 2220823 1/1990

OTHER PUBLICATIONS

International Search Report dated Jun. 30, 2008.
Yeap et al., "A Novel Common-Mode Noise Cancellation Technique for VDSL Applications", IEEE Transactions on Instrumentation and Measurement, vol. 52, No. 4, pp. 1325-1334, Aug. 2003.
Raab et al., "Signal Processing for Through-the-Earth Radio Communicaiton", IEEE Transactions on Communications, vol. 43, No. 12, pp. 2995-3003, Dec. 1995.

(Continued)

Primary Examiner—Tuan A Tran
(74) Attorney, Agent, or Firm—Howard IP Law Group, PC

(57) ABSTRACT

A communications system including: a plurality of sub-surface portable transceivers each including: a digital data source, a modulator coupled to the digital data source, a power amplifier coupled to the modulator and a loop antenna inductively coupled to the power amplifier; and a base transceiver including: an electrically insulated ferrite core antenna for receiving magnetic signals, an electric di-pole antenna for receiving ambient noise, a noise canceller coupled to the insulated ferrite core antenna and electric dipole antenna and responsive to the electric-dipole antenna to filter noise from signals received via the insulated ferrite core antenna, a demodulator coupled to the noise canceller and a decoder coupled to the demodulator.

18 Claims, 15 Drawing Sheets

OTHER PUBLICATIONS

Shyu et al., "Modified FIR Filter with Phase Compensation Technique to Feedforward Active Noise Controller Design", IEEE Transactions on Industrial Electronics, vol. 47, No. 2. pp. 444-453, Apr. 2000.

Mine Safety and Health Administration (MSHA),"Testing Communication and Locating Devices for Undrground Mines", 13 pgs., Jul. 2007.

Mine Site Technologies, "Saves Lives PED Saves Costs", 4 pgs.

* cited by examiner

SUB-SURFACE COMMUNICATIONS SYSTEM AND METHOD

FIELD OF THE INVENTION

This invention relates generally to radio communications systems, and more particularly to radio communications with transceivers positioned underground.

BACKGROUND OF THE INVENTION

When personnel are located underground, such as in mines, tunnels or boreholes, a need exists to establish and maintain communications with such personnel. This is important in emergency situations such as collapsed tunnels or mines, accidents or other crises. A similar need is recognized in association with events and communications occurring in littoral waters. While telephone lines between fixed points provide some measure of communication, these fixed locations may be difficult or impossible to reach under such conditions. Furthermore, radio communications have been problematic and often unreliable in these environments. Alternative systems and methods for establishing and maintaining communications are desired.

SUMMARY OF THE INVENTION

A communications system including: a plurality of sub-surface portable transceivers each including: a digital data source, a controller, a modulator coupled to the digital data source, a power amplifier coupled to the modulator and a loop antenna inductively coupled to the power amplifier; and a base transceiver including: an electrically insulated ferrite core antenna for receiving magnetic signals, an electric dipole antenna for receiving ambient noise, a noise canceller coupled to the insulated ferrite core antenna and electric dipole antenna and responsive to the electric-dipole antenna to filter noise from signals received via the insulated ferrite core antenna, a demodulator coupled to the noise canceller and a decoder coupled to the demodulator.

BRIEF DESCRIPTION OF THE DRAWINGS

Understanding of the present invention will be facilitated by consideration of the following detailed description of the preferred embodiments of the present invention taken in conjunction with the accompanying drawings, in which like numerals refer to like parts and.

DETAILED DESCRIPTION OF THE PREFERRED EMBODIMENTS

The following description of the preferred embodiments is merely by way of example and is in no way intended to limit the invention, its application, or uses.

Figure 1:
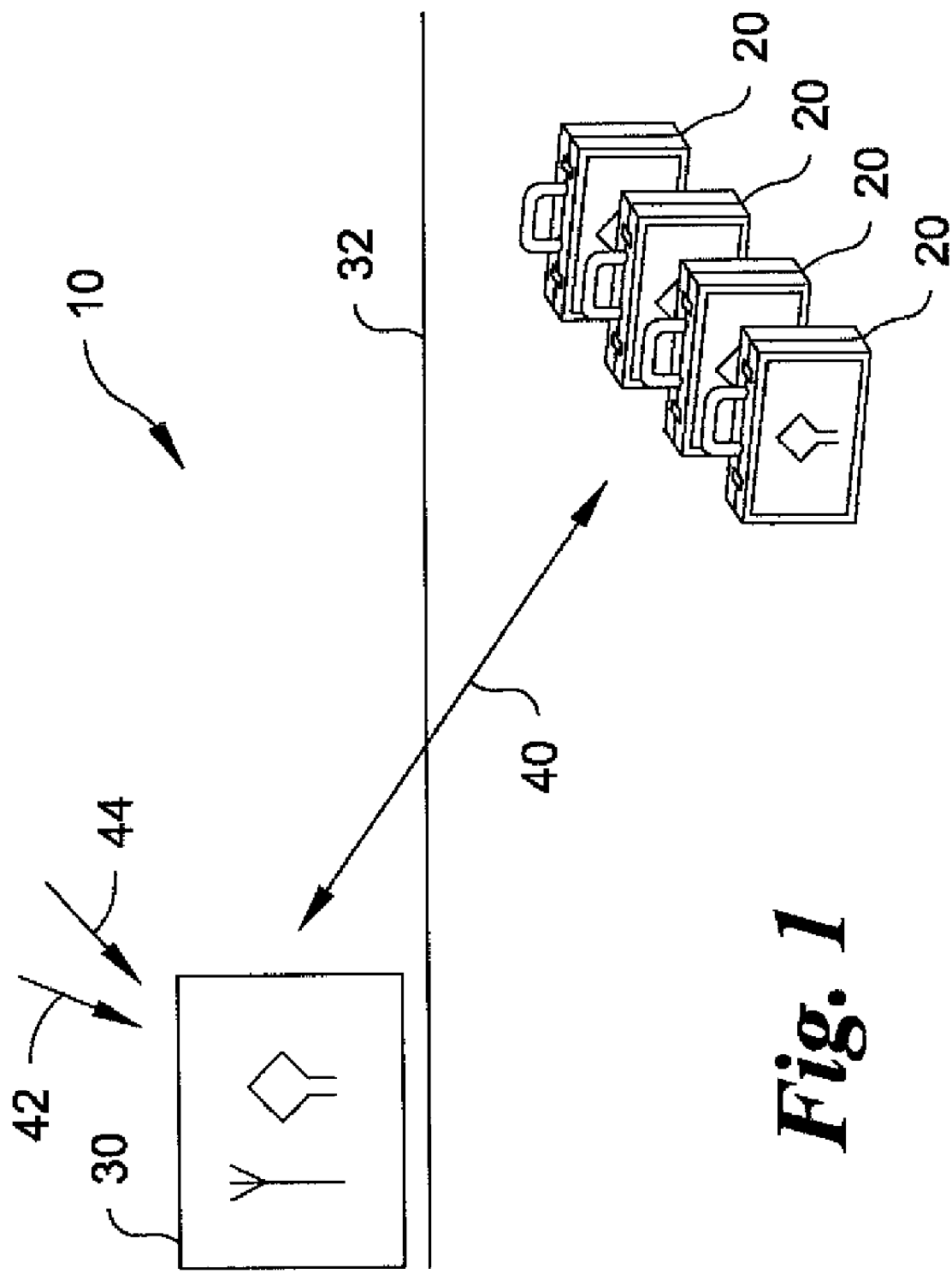
FIG. 1 illustrates a diagram of a system according to an embodiment of the invention.

Referring first to FIG. 1, there is shown a diagram of a system 10 according to an embodiment of the present invention. System 10 includes a plurality of sub-surface portable transceivers each labeled 20. Each transceiver 20 may be underground portable, and/or under-water portable, for example. System 10 includes a surface transceiver 30. In the exemplary embodiment of system 10, base transceiver 30 is on or above surface 32. Surface 32 may take the form of the planet surface (e.g., surface of the Earth), or a surface within the planet (e.g., in a tunnel from the surface of the Earth). In the illustrated embodiment, transceivers 20 and transceiver 30 communicate with one-another via signals 40.

According to an embodiment of the present invention, transceivers 20 may be well suited for being carried by personnel into underground mines, caves and/or into shallow sea water (littoral waters). For example, transceivers 20 may be well suited for being carried on the order of about 2,000 feet underground into a mine, below surface 32, yet still be in communication (via signals 40) with base transceiver 30. While four (4) portable transceivers 20 and one (1) base transceiver 30 are shown for purposes of illustration in FIG. 1, other combinations are expected to be used in actual practice.

Figure 2:
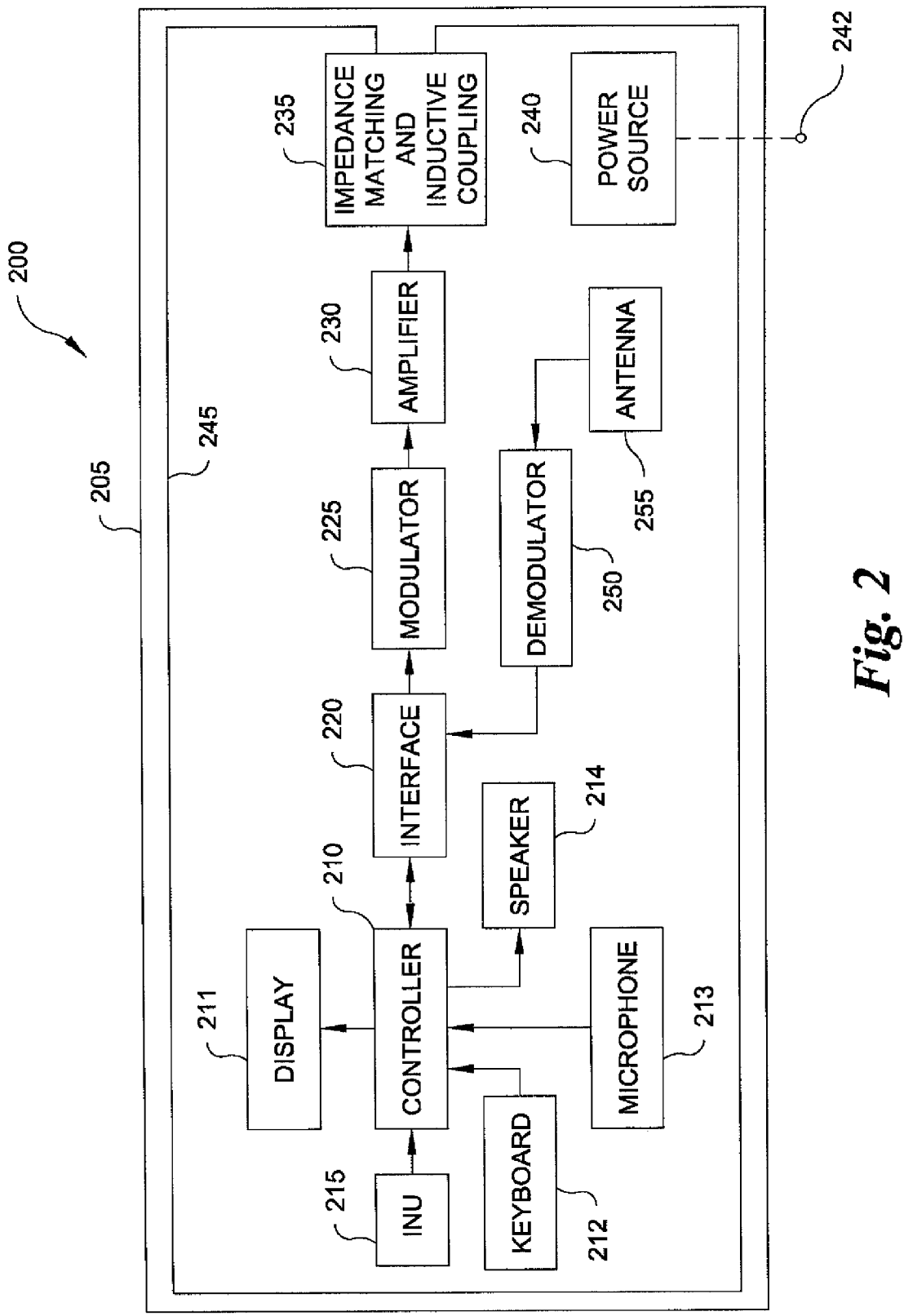
FIG. 2 illustrates a block diagram of a portable transceiver according to an embodiment of the invention.

Referring now also to FIG. 2, there is shown a block diagram of a transceiver 200 being suitable for use as a transceiver 20 according to an embodiment of the present invention. Transceiver 200 includes a housing 205. Housing 205 may be of a suitable size and shape so as to be carried by a person as they progress underground, for example. Housing 205 may be rugged in nature. In the illustrated embodiment of FIG. 1, each housing 205 takes the form of a carrying case for carrying by a human, analogous to that of a conventional briefcase, such as around 15 inches×12 inches×4 inches in dimensions, by way of non-limiting example only.

In the illustrated embodiment and contained within housing 205 is controller 210. Controller 210 may typically take the form of a computing device that includes a processor. A processor generally includes a Central Processing Unit (CPU), such as a microprocessor. A CPU generally includes an arithmetic logic unit (ALU), which performs arithmetic and logical operations, and a control unit, which extracts instructions (e.g., code) from memory and decodes and executes them, calling on the ALU when necessary. "Memory", as used herein, generally refers to one or more devices capable of storing data, such as in the form of chips, tapes, disks or drives. Memory may take the form of one or more random-access memory (RAM), read-only memory (ROM), programmable read-only memory (PROM), erasable programmable read-only memory (EPROM), or electrically erasable programmable read-only memory (EEPROM) chips, by way of further example only. Memory may take the form of internal or external disc drives, for example. Memory may be internal or external to an integrated unit including a processor. Memory preferably stores a computer program or code, e.g., a sequence of instructions being operable by a processor.

Controller 210 may take the form of hardware, such as an Application Specific Integrated Circuit (ASIC) and or firmware, in addition or in lieu of incorporating a processor. The controller may include an encoder for encoding the data or information bearing signals according to one or more encoding techniques, as is known in the art, for subsequent modulation, transmission, reception, demodulation, decoding and processing. Such encoding techniques as multi-carrier modulation and convolutional coding are suitable for application to the present invention. The details of such coding/decoding techniques may be found in prior art literature, such as described in Digital Communication, Third Edition. John R. Barry, Edward A. Lee, and David G. Messerschmitt; Springer, 2004; ISBN 0-7923-7548-3. Multi-carrier modulation is also described in: Modulation and Coding for Linear Gaussian Channels; G. David Forney, Jr. and Gottfried Ungerboeck; IEEE Transactions on Information Theory; Volume 44, Number 6, Pages 2384-2415; October 1998. Convolutional coding techniques are further described in Applications of Error-Control Coding; Daniel J. Costello, Jr., Joachim Hagenauer, Hideki Imai, and Stephen B. Wicker; IEEE Transactions on Information Theory; Volume 44, Number 6, Pages 2531-2560; October 1998.

In the illustrated embodiment and also contained within housing 205 is a display 211. Display 211 may take any suitable form, including by way of example only, a flat panel LCD or plasma graphics supporting display, a CRT-based display, a multi-segment based display and an LCD or LED character-based display. Display 211 is coupled to and operable by controller 210 in a conventional manner.

In the illustrated embodiment and also contained within housing 205 is a keyboard 212. Keyboard 212 may take the form of a conventional or compact keyboard, such as a QWERTY-type keyboard, for example. Keyboard 212 is coupled to and operable in connection with controller 210 in a conventional manner.

In the illustrated embodiment and also contained within housing 205 are a microphone 213 and speaker 214. Microphone 213 and speaker 214 may be of any conventional type, and are also coupled to and operable in connection with controller 210 in a conventional manner.

In the illustrated embodiment and also contained within housing 205 is an inertial navigation unit (INU) 215. For non-limiting purposes of explanation, an INU is an electronic system that continuously monitors the position, velocity, and acceleration of its housing, and provides navigational data or control. An INU typically includes one or more gyroscopes and accelerometers, and a computer. The computer may be integral to controller 210 or in addition thereto. INU 215 is also coupled to and operable in connection with controller 210 in a conventional manner.

According to an embodiment of the present invention, controller 210 may take the form of a portable, personal computer, such as a conventional lap-top computer, having a conventional microphone, speaker and INU operatively coupled thereto.

Interface 220 is operatively coupled to controller 210. According to an embodiment of the present invention interface 220 is adapted to communicate with controller 210. In one embodiment of the present invention, interface 220 may take the form of a serial interface, such as an RS-232 driver/receiver. In one embodiment of the present invention, interface 220 may take the form of a model ADM202 RS-232 driver/receiver, which is commercially available from Analog Devices of Norwood, Mass.

In the illustrated embodiment and also contained within housing 205 is a modulator 225. Modulator 225 is coupled to interface 220. According to an embodiment of the present invention, modulator 225 may take the form of a frequency shift key (FSK) modulator. For non-limiting purposes of explanation, frequency-shift keying is a method for modulating digital data for transmission, where data states are each represented by an analog waveform at a corresponding frequency, such that different data states have different analog signal frequencies. Where binary data states are used, an analog signal at a first frequency represents a zero data state and an analog signal at a second frequency represents a one zero state. In one embodiment of the present invention, modulator 225 may take the form of a model XR-2206 monolithic function generator, which is commercially available from EXAR Corporation of Fremont, Calif. Such a modulator can be used to modulate data embodied in two data states at 990 Hz and 1010 Hz, respectively, for a central frequency of 1000 Hz, for example.

In the illustrated embodiment and also contained within housing 205 is an amplifier 230. Amplifier 230 is coupled to modulator 225. According to an embodiment of the present invention, amplifier 230 may take the form of an audio power amplifier. In one embodiment, amplifier 230 may take the form of a model MAX4295 mono, switch-mode audio power amplifier, which is commercially available from Maxim Integrated Products of Sunnyvale, Calif.

In the illustrated embodiment and also contained within housing 205 is an impedance matching and inductive coupler 235. According to an embodiment of the present invention, coupler 235 may include one or more conventional impedance introducing components for matching the impedance of an inductively coupled loop antenna with amplifier 230. In one embodiment, the impedance introducing component may take the form of a transformer introducing a suitable resistance, such as 2-8 ohms, across the output of the amplifier 230. According to an embodiment of the present invention, coupler 235 may include an inductive coupling component for coupling a loop antenna to amplifier 230. In one embodiment, coupler 235 may include a voltage step-down transformer, such as a transformer having a windings ratio of about 300:1.

In the illustrated embodiment and also contained within housing 205 is a loop antenna 245. Loop antenna 245 is coupled to coupler 235, and through coupler 235 to amplifier 230. According to an embodiment of the present invention, loop antenna 245 may have a round area of about 0.071 square meters. Loop antenna 245 may be about ½ inch thick, and have around 3 or 4 turns, each separated by about ¾ inch. In one embodiment, loop antenna 245 may be composed of AWG 0000 copper wire. Other configurations may be used though. In one embodiment, loop antenna 245 may follow the shape of housing 205. For example, loop antenna 245 may be rectangular in shape and have an area of about 0.132 square meters. Alternatively, a different loop shape from the housing shape may be chosen, e.g., a circular loop. In such an embodiment, electronics may be positioned within housing 205, but outside loop antenna 245.

Referring still to FIG. 2, in the illustrated embodiment transceiver 200 also includes a power source 240. Power source 240 is illustrated as being contained within housing 205, but may optionally be external thereto. Alternatively, power source 240 may be contained within housing 205, and include terminals 242 that extend from housing 205. Terminals 242 may optionally be used to provide additional power to supply 240, and/or charge supply 240. Terminals 242 may optionally be used to provide power from supply 240 to power one or more devices external to housing 205. Power supply 240 may be coupled to the other components of transceiver 200 to power them. In one embodiment of the present invention, power supply 240 may take the form of a rechargeable battery, and provide voltage outputs of about +/−5 VDC and +/−12 VDC.

Figure 3:
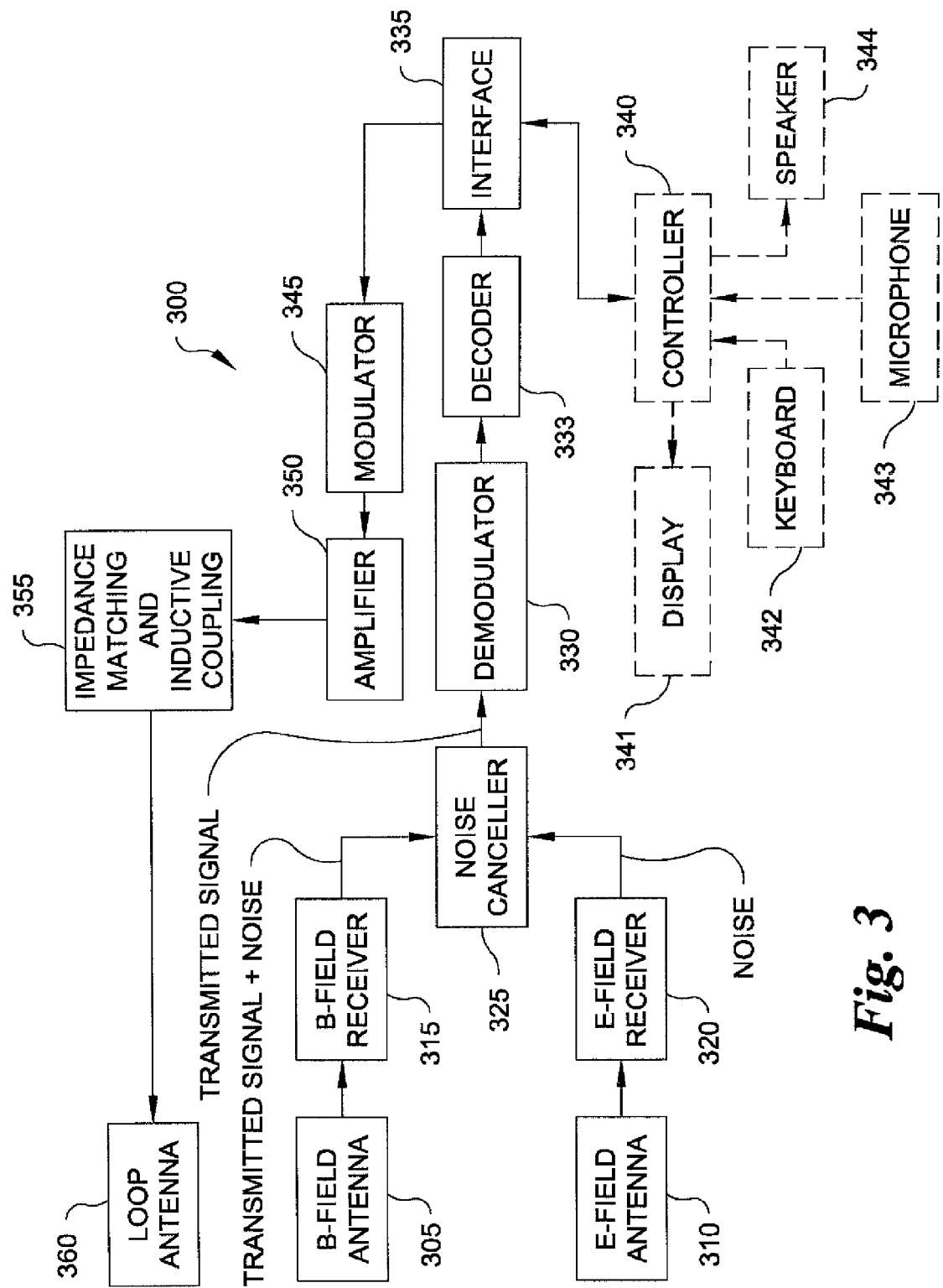
FIG. 3 illustrates a block diagram of a base transceiver according to an embodiment of the invention.

Referring still to FIG. 2, transceiver 200 additionally includes a demodulator 250 and may further optionally include a decoder as discussed with regard to the decoder 333 of FIG. 3 (for the case where controller 340 of FIG. 3 operates to encode data/information signals for transmission to transceiver 200). Demodulator 250 is coupled to an antenna 255. Antenna 255 may be adapted for receiving communications from transceiver 30 (FIG. 1). Antenna 255 may take the form of a ferrite bar loop antenna, for example. Demodulator 250 is also coupled to interface 220. According to an embodiment of the present invention, demodulator 250 may take the form of a frequency shift key (FSK) demodulator. In one embodiment of the present invention, demodulator 250 may take the form of a model XR-2211 FSK demodulator/tone decoder, which is commercially available from EXAR Corporation of Fremont, Calif. Such a demodulator can be used to demodulate data modulated by modulator 345 (FIG. 3) and if encoding of transceiver 300 is implemented, a corresponding demodulator/decoder of transceiver 200 provides decoding of the encoded transmitted data/information signals as is understood by those skilled in the arts. Alternatively, transceiver 200 may incorporate the components of transceiver 300 of FIG. 3, or in addition to the components discussed hereinabove.

Referring now to FIG. 3, there is shown a block diagram of a transceiver 300 being suitable for use as a transceiver 30 according to an embodiment of the present invention. In the illustrated embodiment, transceiver 300 includes both magnetic (b-field) and electric (e-field) antennas 305, 310. Antenna 305 may take the form of an electrically insulated, ferrite bar loop antenna, for example. Antenna 310 may take the form of a vertical dipole receive antenna, for example. Magnetic antenna 305 could take the form of a ferrite core 0.629 meters in length, 0.0284 meters in diameter, with a metallic sheath having a slit cut therein to provide electric shielding while allowing magnetic fields to pass. The electric dipole antenna 310 could take the form of a permanent mount swivel angle whip antenna, DIGIKEY part number ANT-418-PW-RA-ND, which is a few inches high In the illustrated embodiment, transceiver 300 includes magnetic (b-field) and electric (e-field) receivers 315, 320. Receiver 315 is coupled to antenna 305. Receiver 320 is coupled to antenna 310.

According to an embodiment of the present invention, receiver 315 may include a tuned circuit, automatic gain control and pre-amplifier for receiving signals transmitted from transceivers 20, in addition to the magnetic component of ambient electromagnetic noise. In one embodiment, receiver 315 may take the form of a conventional audio amplifier due to the low audio frequencies of the received signals. According to an embodiment of the present invention, receiver 320 may include a tuned circuit, automatic gain control and pre-amplifier for receiving the electric component of electromagnetic noise corresponding to the magnetic component of electromagnetic noise received via antenna 305 and receiver 315. Receiver 320 may similarly take the form of a conventional low frequency audio amplifier device.

In the illustrated embodiment, transceiver 300 also includes a noise canceller 325. Noise canceller 325 is coupled to receivers 315, 320. Noise canceller 325 receives, from receiver 315, signals transmitted from transceivers 20, in addition to the magnetic component of ambient electromagnetic noise. Noise canceller 325 receives, from receiver 320, the electric component of ambient electromagnetic noise. According to an embodiment of the present invention, noise canceller 325 filters the output of receiver 315 dependently upon the output of receiver 320. According to an embodiment of the present invention, noise canceller 325 filters out that portion of the output of receiver 315 that correlates to the output of receiver 320 (e.g., the noise canceller filters received signals transmitted from transceivers 20 and the magnetic component of ambient electromagnetic noise to remove the magnetic component of ambient electromagnetic noise that correlates to the electric component of ambient electromagnetic noise received via antenna 310 and receiver 320).

Noise canceller 325 may take the form of conventional hardware, software and/or firmware suitable for correlating the electrical and magnetic components of the ambient electromagnetic noise, and filtering the magnetic component from the output of receiver 320. In one embodiment of the present invention, noise canceller 325 may take the form of conventional hardware, software and/or firmware suitable for employing the approach discussed in "A NOVEL COMMON-NODE NOISE CANCELLATION TECHNIQUE FOR VDSL APPLICATIONS", by Tet H. Yeap, David Fenton and Pierre Lefebvre, IEEE Transactions On Instrumentation and Measurement (Vol. 52, No. 4, August 2003). In one embodiment of the present invention, noise canceller 325 may take the form of conventional hardware, software and/or firmware suitable for employing the approach discussed in "MODIFIED FIR FILTER WITH PHASE COMPENSATION TECHNIQUE TO FEEDFORWARD ACTIVE NOISE CONTROLLER DESIGN", by Kuo-Kai Shyu and Cheng-Yuan Chang, IEEE Transactions On Industrial Electronics (Vol. 47, No. 2, April 2000).

In the illustrated embodiment, transceiver 300 also includes a demodulator 330. Demodulator 330 is coupled to noise canceller 325. According to an embodiment of the present invention, demodulator 330 may take the form of a frequency shift key (FSK) demodulator. In one embodiment of the present invention, demodulator 330 may take the form of a model XR-2211 FSK demodulator/tone decoder, which is commercially available from EXAR Corporation of Fremont, Calif. Such a demodulator can be used to demodulate data modulated by modulator 225 (FIG. 2).

The noise cancelled, demodulated signal is then input into decoding processor 333. The decoding processor or decoder 333 operates on the input demodulated signal to decode the signal encoded by the controller using one or more decoding techniques, such as quadrature, multi-tonal, convolutional decoding, and so on, as is understood by those skilled in the art. The decoder operates to further separate the data or information bearing signal components associated with the original signal (from transceiver 20) from noise components.

The demodulated, decoded signal output from the decoder may be provided to interface 335. Interface 335 may be operatively coupled to a controller, optionally the illustrated controller 340. Interface 335 may provide data input/output, that may be coupled to a conventional computing device external to transceiver 300. In one embodiment of the present invention, interface 335 may take the form of a serial interface, such as an RS-232 driver/receiver. In one embodiment of the present invention, interface 335 may take the form of a model ADM202 RS-232 driver/receiver, which is commercially available from Analog Devices of Norwood, Mass. Where the components of transceiver 300 are incorporated into transceiver 200 (FIG. 2), interface 220 may serve as interface 335, and controller 210 may serve as a digital data source and sink.

In the illustrated embodiment, transceiver 300 may optionally include controller 340. Controller 340 may typically take the form of a computing device that includes a processor. The controller may optionally include an encoder for encoding data or information bearing signals according to one or more encoding techniques, such as multi-carrier modulation, convolutional coding and so on, as is known in the art, for subsequent modulation, transmission, reception, demodulation, decoding and processing. In the illustrated embodiment, transceiver 300 may optionally include a display 341. Display 341 may take any suitable form, including by way of example only, a flat panel LCD or plasma graphics supporting display, a CRT-based display, a multi-segment based display and an LCD or LED character-based display, for example. Display 341 is coupled to and operable by controller 340 in a conventional manner. In the illustrated embodiment, transceiver 300 may optionally include a keyboard 342. Keyboard 342 may take the form of a conventional or compact keyboard, such as a QWERTY-type keyboard, for example. Keyboard 342 is coupled to and operable in connection with controller 340 in a conventional manner. In the illustrated embodiment, transceiver 340 may optionally include a microphone 343 and speaker 344. Microphone 343 and speaker 344 may be of any conventional type, and are also coupled to and operable in connection with controller 340 in a conventional manner. According to an embodiment of the present invention, controller 340 may take the form of a personal computer having a conventional microphone and speaker operatively coupled thereto.

Referring still to FIG. 3, the illustrated embodiment of transceiver 300 also includes a modulator 345. Modulator 345 is coupled to interface 335. According to an embodiment of the present invention, modulator 345 may take the form of a frequency shift key (FSK) modulator. In one embodiment of the present invention, modulator 345 may take the form of a model XR-2206 monolithic function generator, which is commercially available from EXAR Corporation of Fremont, Calif. The illustrated embodiment of transceiver 300 additionally includes an amplifier 350. Amplifier 350 is coupled to modulator 345. According to an embodiment of the present invention, amplifier 350 may take the form of an audio power amplifier. In one embodiment, amplifier 350 may take the form of a model MAX4295 mono, switch-mode audio power amplifier, which is commercially available from Maxim Integrated Products of Sunnyvale, Calif. The illustrated embodiment of transceiver 300 additionally includes an impedance matching and inductive coupler 355. According to an embodiment of the present invention, coupler 355 may include one or more conventional impedance introducing components for matching the impedance of antenna 305 with amplifier 350. In one embodiment, the impedance introducing component may take the form of a transformer introducing a suitable resistance, such as 2-8 ohms across the output of the amplifier 350. According to an embodiment of the present invention coupler 355 may include an inductive coupling component for coupling antenna 360 to amplifier 350. In one embodiment, coupler 355 may include a voltage step-down transformer, such as a transformer having a windings ratio of about 300:1. Antenna 360 may take the form of a loop antenna suitable for communicating with transceivers 20 (FIG. 1). Alternatively, transceiver 300 may additionally incorporate the components of transceiver 200, such that both devices 200 and 300 may send and receive data to and from one another, e.g., provide for bidirectional communications.

According to an embodiment of the present invention, signals 40 (FIG. 1) take the form of low frequency magnetic signals. By way of non-limiting example, signals 40 may have a center frequency between about 90 Hz and 3,000 Hz. At the upper end, signals 40 may carry digitized voice information between transceivers 20, 30. At the lower end, signals 40 may carry data at a rate of around 10 bits per second, which may correspond to about an alphanumeric character a second. Depending upon the distance between transceivers 20, 30 and the nature of material (e.g., rock and/or water) interposed between transceivers 20, 30, a center frequency between about 90 Hz and about 3,000 Hz may be selected. Referring now to Table-1, there is shown the conductivity of various materials (in Siemens/meter)

TABLE 1

| MATERIAL TYPE | CONDUCTIVITY (MHO/M) |
|---|---|
| DRY LIMESTONE | 0.001 |
| AVERAGE ROCK (ESTIMATE) | 0.01 |
| MINE ROCK | 0.1 |
| COAL MINE ROCK | 0.05-0.28 |
| SALT MINE | $1.5 \times 10^{-1}$ |
| SALT WATER | 5 |

In a sense, the communications medium for signals 40 is the material, and there are many different types of material. Different types of material have different conductances, such that some materials, like salt water have a high conductance, but tend to short out magnetic fields. Accordingly, signals 40 may not propagate well in salt water, but do propagate well in limestone rock, which has a low conductance. For example, dense coals may have a conductance around 0.25. Accordingly, signals 40 near the low end of the frequency range may be used to increase transmission distance through dense coals. But, in dry limestone, a frequency at the upper end of the range, that supports real-time voice communications at up to about 600 meters, may be used—as dry limestone has a conductance around 0.001.

Accordingly, signals 40 will generally be in the range of supported frequencies, understanding that the higher the frequency the higher a supported data rate will be, but the shorter the useful transmission range will be. Trial and error may be used to determine a best frequency that balances these competing interests, or communications may begin at a low data rate (and low frequency), and be increased at predetermined increments (e.g., 25-500 Hz at a time), until the maximum sustainable communications frequency, and hence data rate, is established. Referring now to Table-2, there are some expected achievable depths and data rates for various materials.

TABLE 2

| MATERIAL TYPE | REAL-TIME VOICE | VOICE-MAIL | DATA AND TEXT |
|---|---|---|---|
| DRY LIMESTONE | 600 m @ 2.5 Kbps | 600 m @ 2.5 Kbps | 600 m @ 2.5 Kbps |
| AVERAGE ROCK (ESTIMATE) | 400 m @ 2.5 Kbps | 500 m @ 500 bps | 600 m @100 bps |
| MINE ROCK | n/a | n/a | 400 m @ 100 bps 600 m @ 10 bps |
| COAL MINE ROCK | n/a | n/a | 300 m @ 100 bps 600 m @ 10 bps |

For non-limiting purposes of explanation, the embodiments of the present invention shown in FIGS. 1-3 will next be discussed as they relate to transmissions from a transceiver 200 positioned underground to a surface positioned, base transceiver 300.

Referring again to FIG. 2, controller 210 serves as a digital data source, e.g., a source of digitized voice communications input via microphone 213 and/or alphanumeric data entered via keyboard 212. In other words, either voice activity conventionally captured by microphone 213 and digitized by an analog/digital conversion functionality of controller 210 and/or data conventionally captured using keyboard 212 is used to provide digital data indicative thereof. The digital data is provided via a serial data link (i.e., RS-232) to interface 220. Interface 220 receives the digital data and transmits it at transistor-to-transistor logic (TTL) levels to modulator 225.

Modulator 225 FSK modulates the digital data at a frequency in the range of useable frequencies (e.g., about 90 Hz to about 3,000 Hz). The resulting frequency modulated digital data is provided to amplifier 230, which amplifies the modulated digital data. The amplified, modulated digital data is then provided through coupler 235 to loop antenna 245.

As set forth above, coupler 235 is an inductive coupler, such as a voltage step down transformer having a winding ratio of about 300:1. Where amplifier 230 is a 12 watt power amplifier, it may provide a 1 amp signal to the transformer. The transformer steps the voltage down to loop antenna 245, but steps up the current put into the loop antenna. With a windings ratio of around 300:1, the voltage in the loop will be about 1/300th of what was applied by the amplifier 230, but the current will be about 300 times greater. The loop antenna could be embodied as one (1) or more loops of AWG 0000 copper wire, which is capable of carrying the induced current. As the transmission strength of a loop antenna is associated with the area (A) of the loop, the number (N) of windings and current (I) in the windings, this results in a strong transmission of the amplified, modulated digital data. The product of the antenna loop characteristics, $A*N*I$, is known as the magnetic moment (MM) and indicates the strength of the magnetic field produced.

Referring now again to FIG. 3, transceiver 300 includes two antennas 305, 310. Antenna 305 receives substantially only magnetic field (b-field) components while antenna 310 receives substantially only electric field (e-field) components. Due to signal propagation through Earth materials (e.g., rock and water), primarily only the magnetic component of signals 40 reach transceiver 30. Accordingly, only antenna 305 receives signals 40—as no appreciable e-field component of signals 40 reaches antenna 310 due to e-field attenuation. Antenna 305 receives the magnetic component 42 (FIG. 1) of ambient electromagnetic noise in addition to the magnetic component of signal 40. Antenna 310 receives the electric component 44 (FIG. 1) of ambient electromagnetic noise. Noise canceller 325 correlates the received electric component (44) of ambient electromagnetic noise with a portion of the signal from receiver 315 (e.g., that portion resulting from magnet component 42), and filters the correlated portion (e.g., 42) from the output of receiver 315. Accordingly, substantially only the frequency modulated digital data carried by received signal 40 is passed by noise canceller 325 to demodulator 330. Demodulator 330 FSK demodulates the received signal passed from noise canceller 325, transmitting transistor-to-transistor logic (TTL) level signals to interface 335. Interface 335 provides the demodulated signals via a serial link (e.g., RS-232) to controller 340, which acts upon it in a conventional manner. For example, where controller 210 (FIG. 2) provided text as digital data, controller 340 reproduces the text using display 341. Where controller 210 (FIG. 2) provided digitized audio (e.g., voice signals) as digital data, controller 340 reproduces the digitized audio using speaker 344.

For non-limiting purposes of explanation, the embodiments of the present invention shown in FIGS. 1-3 will next be discussed as they relate to transmissions from a surface positioned, base transceiver 300 to a transceiver 200 positioned underground.

Where transceiver 200 incorporates the components of transceiver 300, and transceiver 300 incorporates the components of transceiver 200, processing may be analogous to that described above.

By way of further non-limiting example, and referring again to FIG. 3, controller 340 serves as a digital data source, e.g., a source of digitized voice data input via microphone 343 and/or alphanumeric data entered via keyboard 342. The digital data is provided via a serial data link (i.e., RS-232) to interface 335. Interface 335 receives the digital data and transmits it at transistor-to-transistor logic (TTL) levels to modulator 345. Modulator 345 FSK modulates the digital data at a frequency in the range of useable frequencies (e.g., about 90 Hz to about 3,000 Hz). The resulting frequency modulated digital data is provided to amplifier 350, which amplifies the modulated digital data. The amplified, modulated digital data is then provided through coupler 355 to antenna 360, which transmits signals 40.

Analogously as with transmissions from a transceiver 200 to a transceiver 300, substantially only the magnetic field component of signals 40 reaches transceiver 200. Referring now again to FIG. 2, signals 40 are received by antenna 255, and passed to demodulator 250. Demodulator 250 FSK demodulates the received signal passed from antenna 255, transmitting transistor-to-transistor logic (TTL) level signals to interface 220. Interface 220 provides the demodulated signals via a serial link (e.g., RS-232) to controller 210, which acts upon it in a conventional manner. For example, where controller 340 (FIG. 3) provided text as digital data, controller 210 reproduces the text using display 211. Where controller 340 (FIG. 3) provided digitized audio (e.g., voice signals) as digital data, controller 210 reproduces the digitized audio using speaker 214.

The following discussion illustrates some operational expectations for particular embodiments of the present invention, and is provided solely by way of non-limiting example.

Figure 4B:
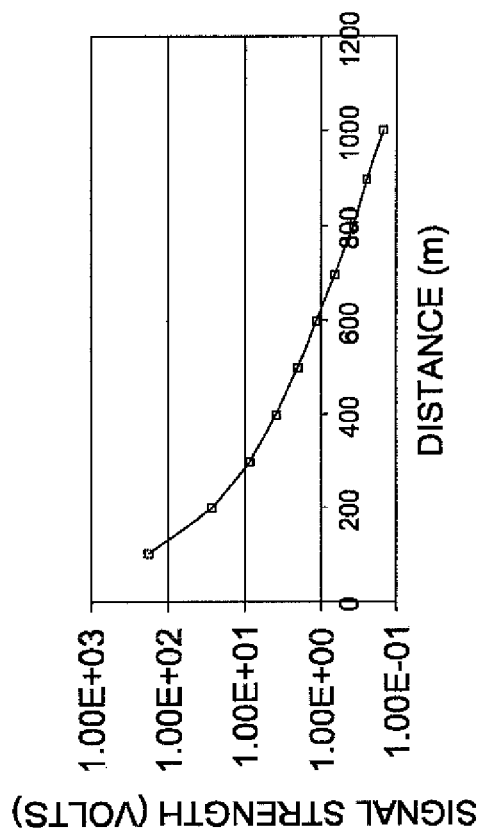
FIGS. 4-15 illustrate various expected performance characteristics of systems according to embodiments of the present invention.
Figure 4A:
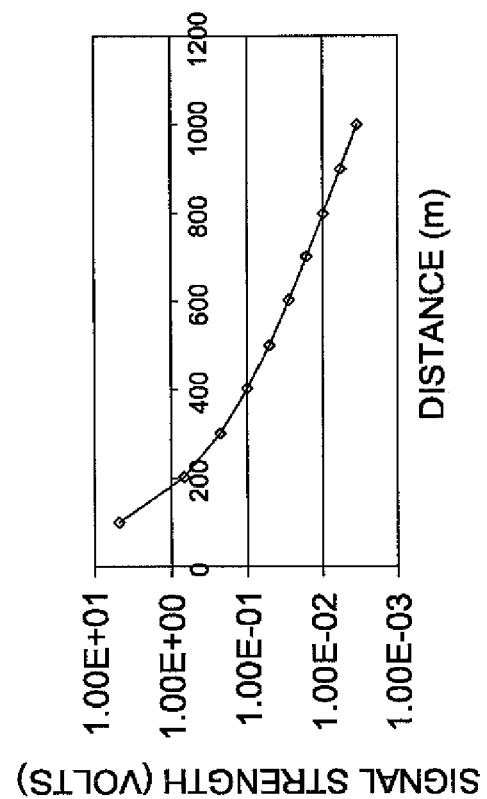

Referring now to FIGS. 4a and 4b, there are shown operational characteristics of systems according to embodiments of the present invention. In both cases a transmit loop having a round area of about 0.071 square meters, 196 turns and a winding current of 1 amp was used at a frequency of 3,000 Hz. FIG. 4a shows the expected performance of an electrically shielded ferrite loop having a small ferrite core (e.g., on the order of about 0.142 meters long by 0.0284 meters in diameter with 393 turns of wire). FIG. 4b shows the expected performance of a electrically shielded ferrite loop having a large ferrite core (e.g., on the order of about 0.629 meters long by 0.0284 meters in diameter with 1,730 turns of wire). It is expected that the signal strength shown in FIG. 4a corresponds to a received voltage of about 0.03 V at 600 m through dry limestone. It is expected that the signal strength shown in FIG. 4b corresponds to a received voltage of about 1.1 V at 600 m through dry limestone. Accordingly, it is expected that a large core ferrite loop antenna may provide for improved sensitivity as compared to a small core ferrite loop antenna. For example, 1,730 turns on the larger core provides about 4.4 times more received signal voltage than the 393 turns of wire on the smaller core. The present invention will be further discussed as it relates to a large core ferrite antenna for non-limiting purposes of completeness only.

Figure 5:
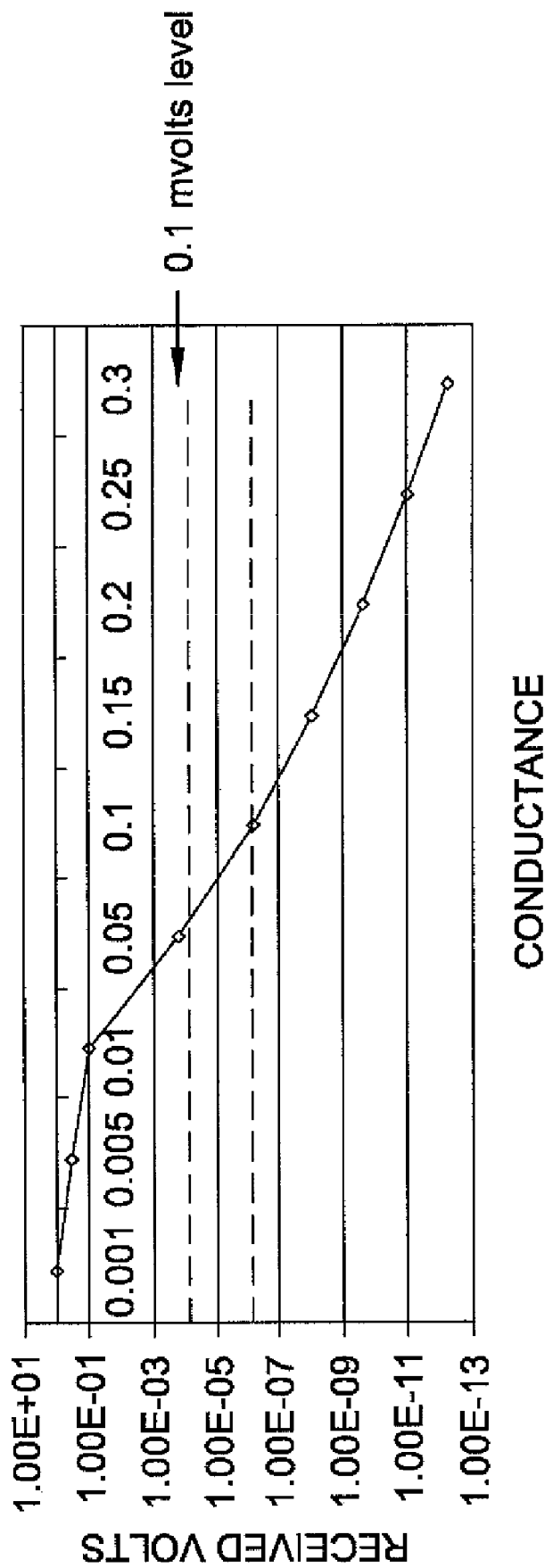

Referring now to FIG. 5, there is shown the expected effect of different rock conductances on received voltage. The received voltages again are reflective of a transmit loop having a round area of about 0.071 square meters, 196 turns and a winding current of 1 amp was used at a frequency of 3,000 Hz. As can be seen therein, it is expected that a received signal by a large core ferrite loop antenna of about 1 µV is expected at a distance of about 600 m with an intervening material conductance of about 0.1 (which corresponds to typically mine rock). Accordingly, it is expected that 1 µV of received signal strength is achievable at 600 m in a typical mine condition using a transmit loop having a round area of about 0.071 square meters, 196 turns and a winding current of 1 amp was used at a frequency of 3,000 Hz, or the equivalent (i.e. same magnetic moment) thereof.

Figure 6:
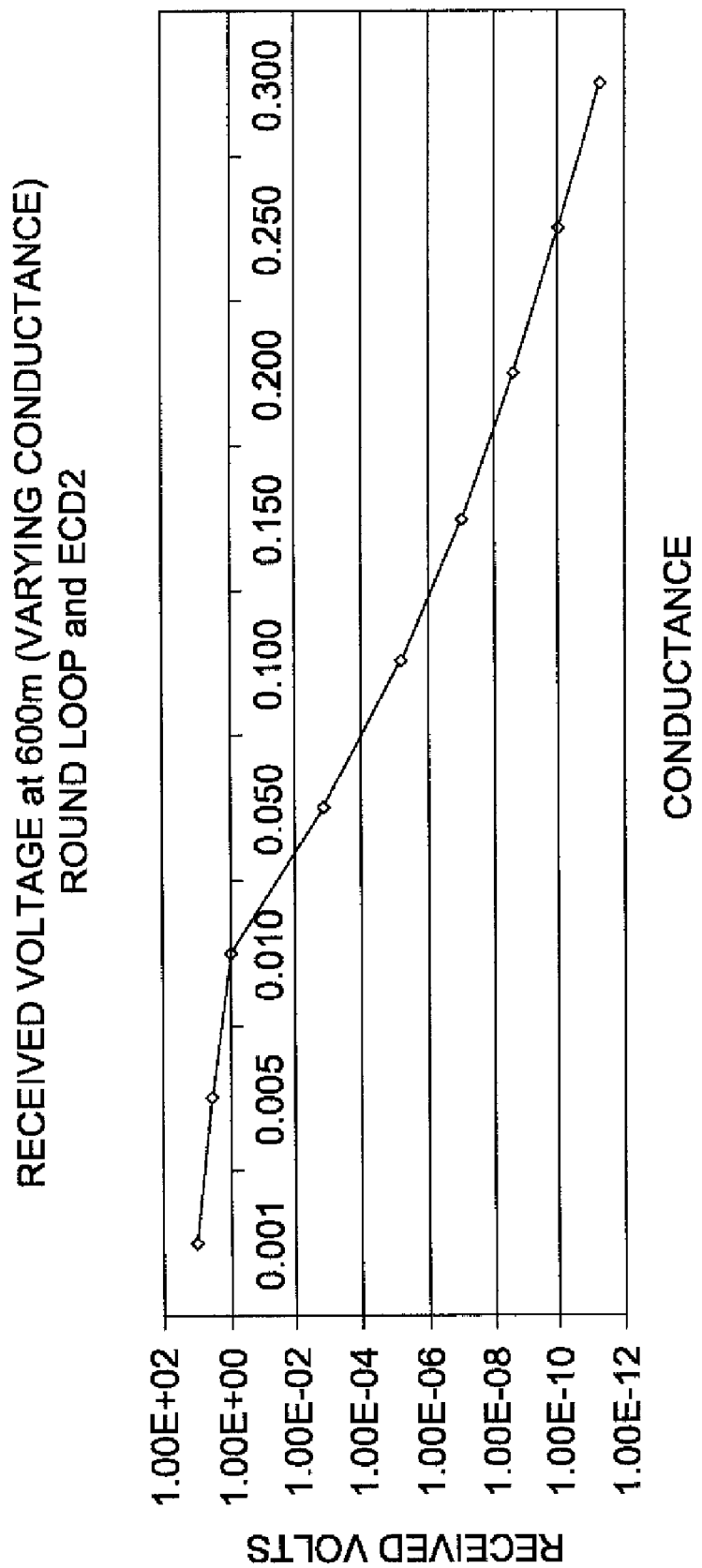

Referring now to FIG. 6, there is shown the expected effect of different rock conductances on received voltage, but with a transmit loop antenna of 0.071 square meters in area, 380 turns of wire, and 1 amp for a total loop current of 380 amps, and with a receive antenna having 8,550 turns. As can be seen therein, an expected received signal voltage corresponding thereto is about 0.1 mV with a conductance of about 0.075, which is typical of some coal mines. An expected received signal voltage of 1 µV is expected with a conductance of 0.125, which is typical of regular mine rock.

Figure 7:
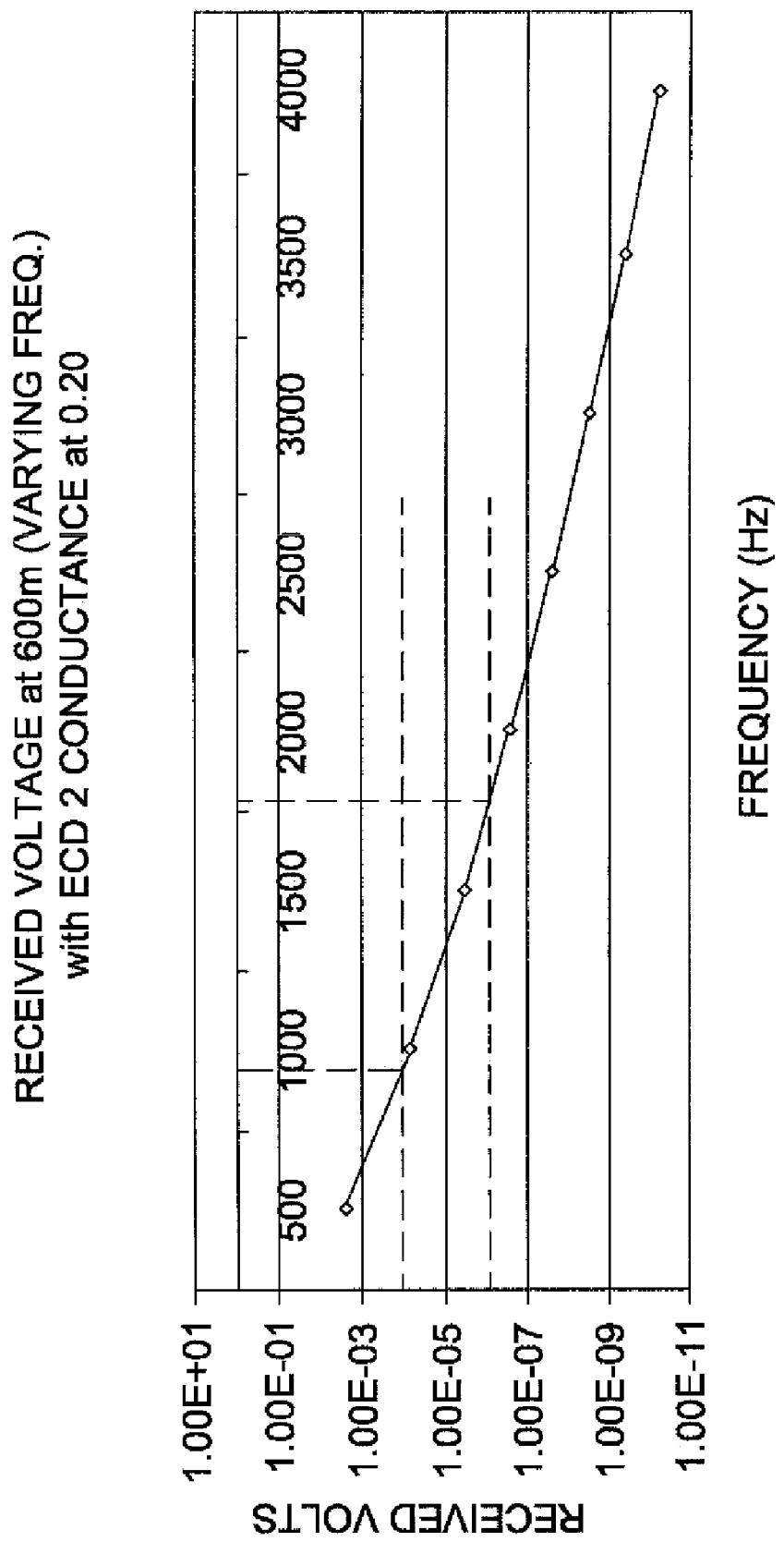

Referring now to FIG. 7, there is shown an expected effect of varying frequency on received signal voltage. It is expected that received voltage will decrease with increasing signal frequency. At a rock conductance of 0.2, 0.1 mV of received signal strength is expected to occur at 600 m with a signal frequency of 1,000 Hz. At a rock conductance of 0.2, 1 µV of received signal strength is expected to occur at 600 m with a signal frequency of 1,750 Hz.

Figure 8:
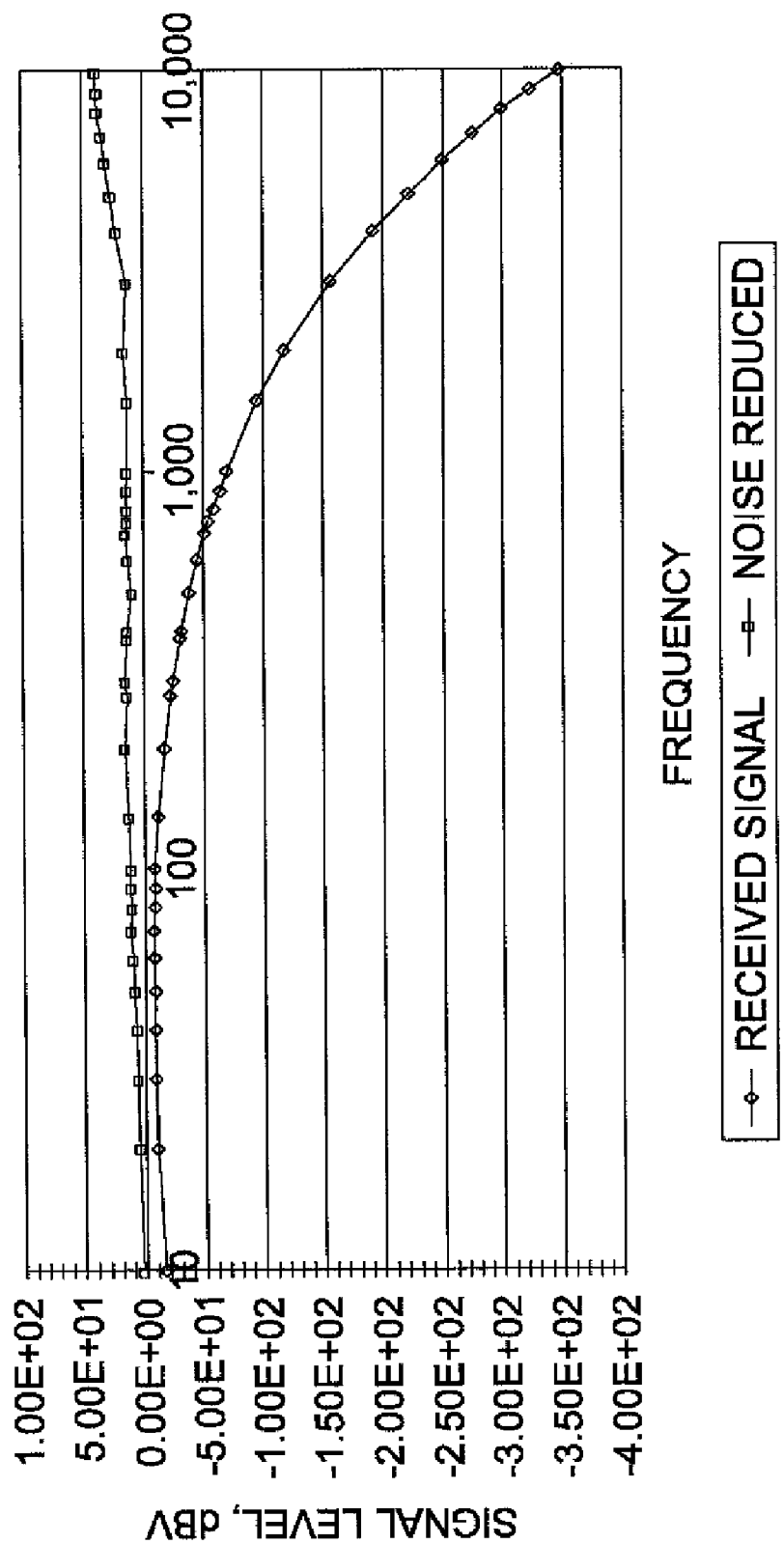

Referring now to FIG. 8, there is shown an expected received signal and noise characteristic versus frequency for a system analogous to that described with regard to FIGS. 1-3, for a rock conductance of 0.2, which is typical of some coal mines, and a noise bandwidth of 60 Hz. Both received signal and noise are shown therein. The received environmental noise has been reduced by 20 dB via noise canceller 325 while the signal is as received on the surface of the earth with the larger ferrite core antenna 305. The source of the signal (FIG. 2) is located 600 meters below the surface.

Figure 9:
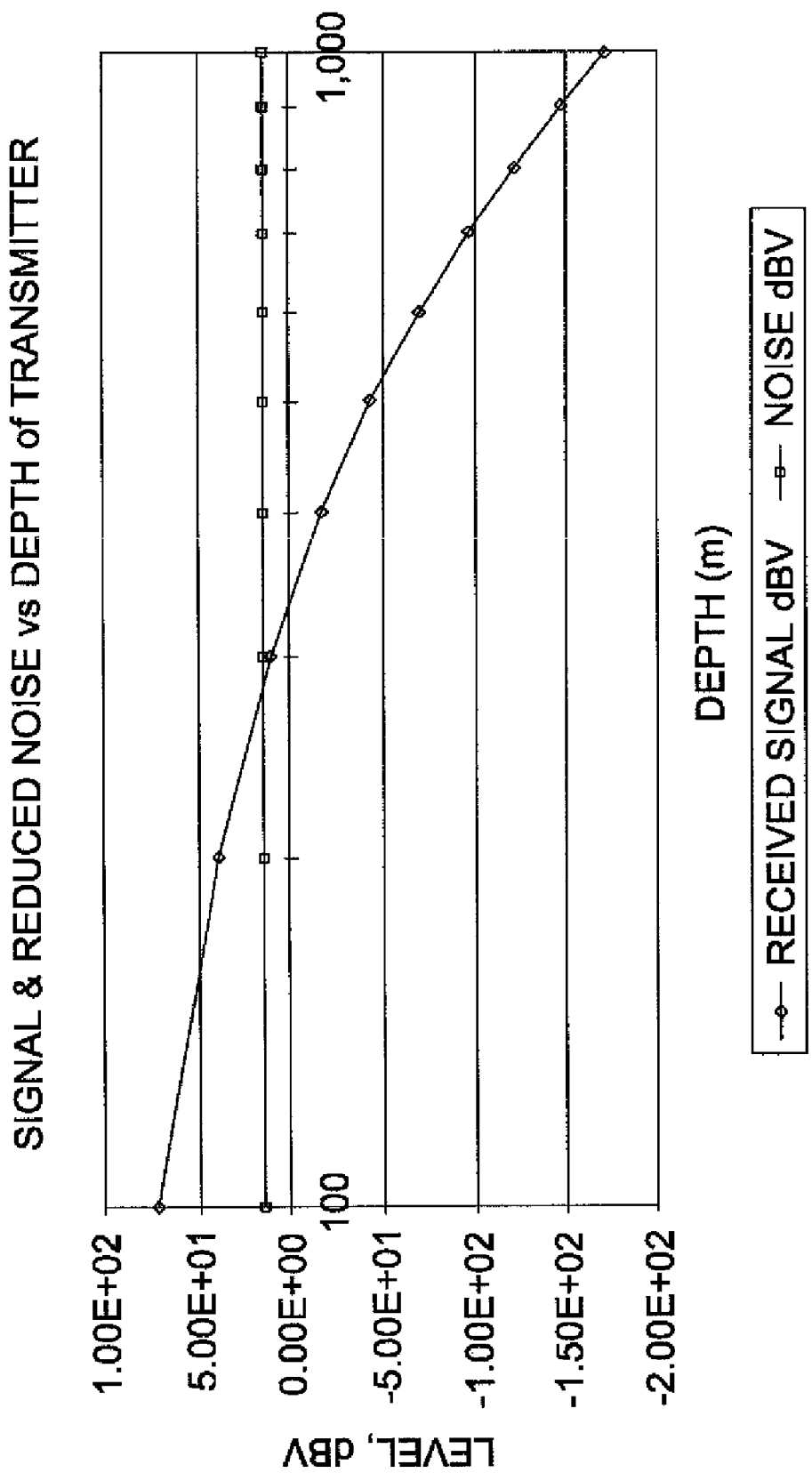

Referring now to FIG. 9, there is shown the effect of varying the depth of the source (FIG. 2) on received signal and noise on the surface. The illustrated example is expected for a conductance of 0.2, an operating frequency of 1,000 Hz resulting in a signal-to-noise ratio of about 10 dB at 250 m, and −10 at about 325 m. Again, a noise bandwidth of 60 Hz and 20 dB of noise reduction are used. The received environmental noise has been reduced by 20 dB via noise canceller 325 while the signal is as received on the surface of the earth with the larger ferrite core antenna 305. The source of the signal (FIG. 2) is located below the surface.

Figure 10:
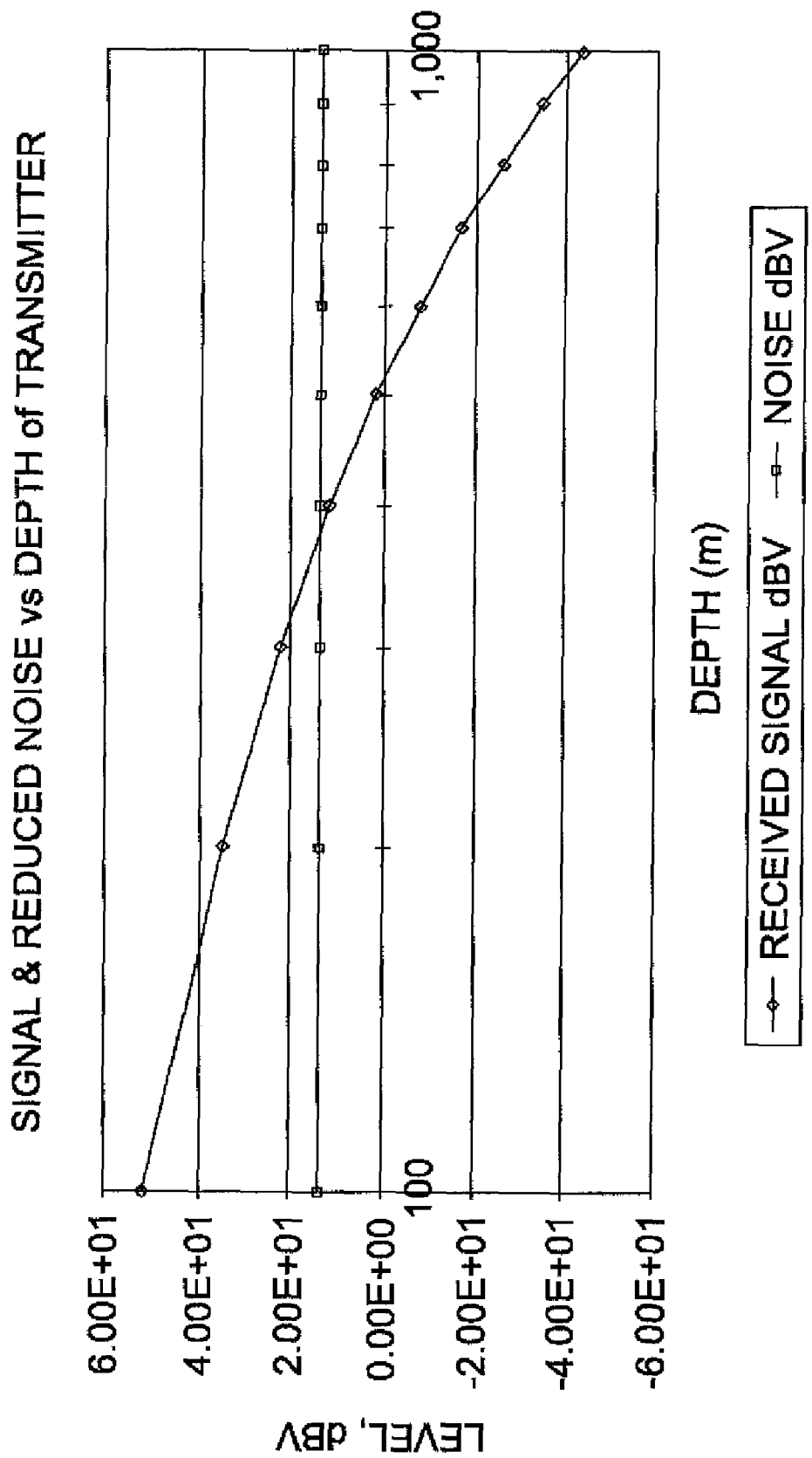

Referring now to FIG. 10, there is shown the effect of varying depth on received signal and noise. The illustrated example is expected for a conductance of 0.2, an operating frequency of 100 Hz resulting in a signal-to-noise ratio (of about 10 dB at 350 m, and −10 at about 425 m. Again, a noise bandwidth of 60 Hz and 20 dB of noise reduction are used. This figure shows the increased range that lowering the transmitting frequency provides. Lowering the frequency from 1,000 Hz. (FIG. 9) to 100 Hz provides an additional 100 meters of operating depth at the same signal-to-noise ratio (SNR).

Figure 11:
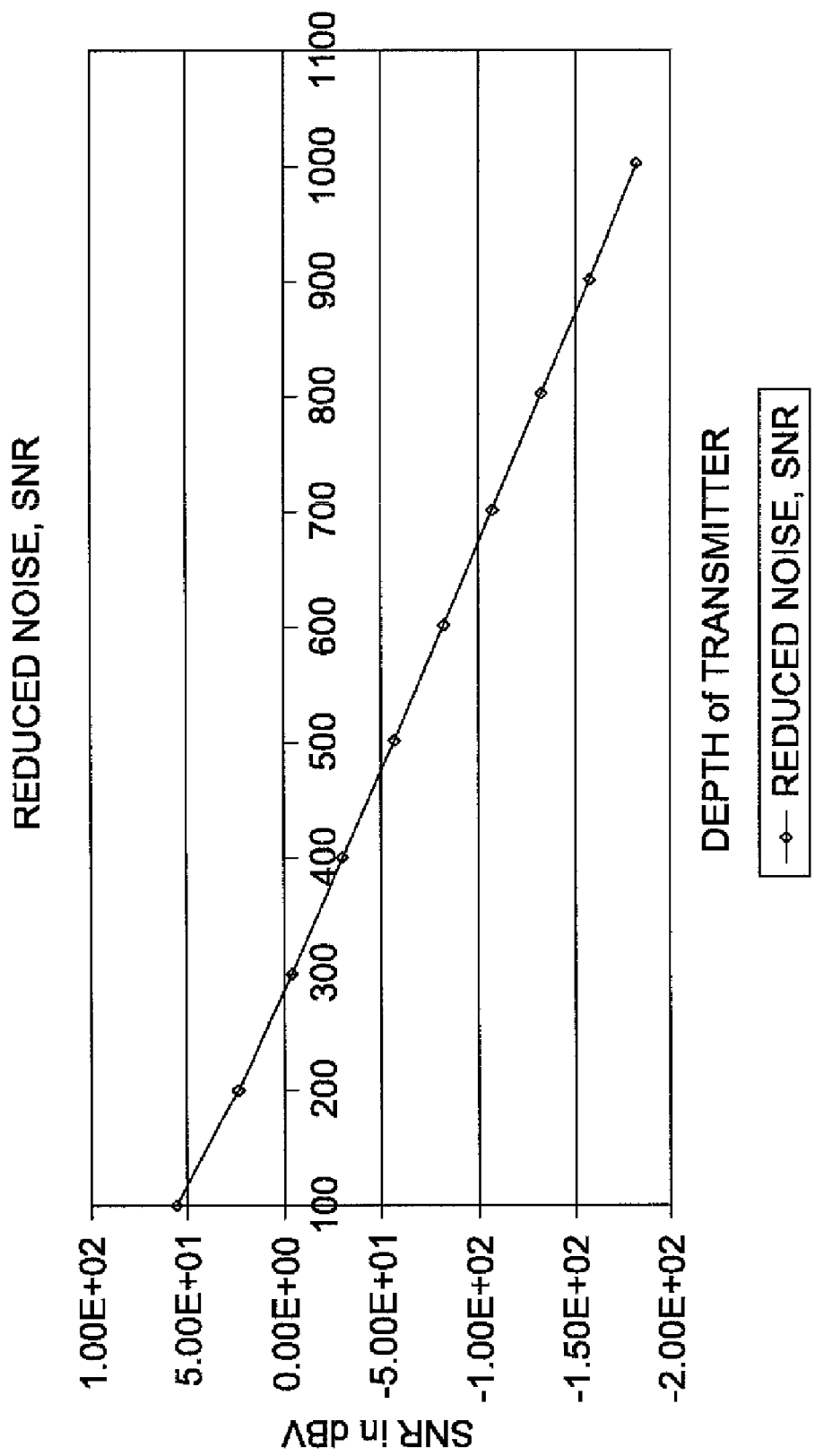

Referring now to FIG. 11, there is shown the effect of varying depth on the signal-to-noise ratio after noise reduction. The illustrated example is expected for a conductance of 0.2, an operating frequency of 1,000 Hz resulting in a signal-to-noise ratio of about 10 dB at 250 m, and −10 at about 325 m. Again, a noise bandwidth of 60 Hz and 20 dB of noise reduction are used. The received environmental noise has been reduced by 20 dB via noise canceller 325 while the signal is as received on the surface of the earth with the larger ferrite core antenna 305. The source of the signal (FIG. 2) is located below the surface.

Figure 12:
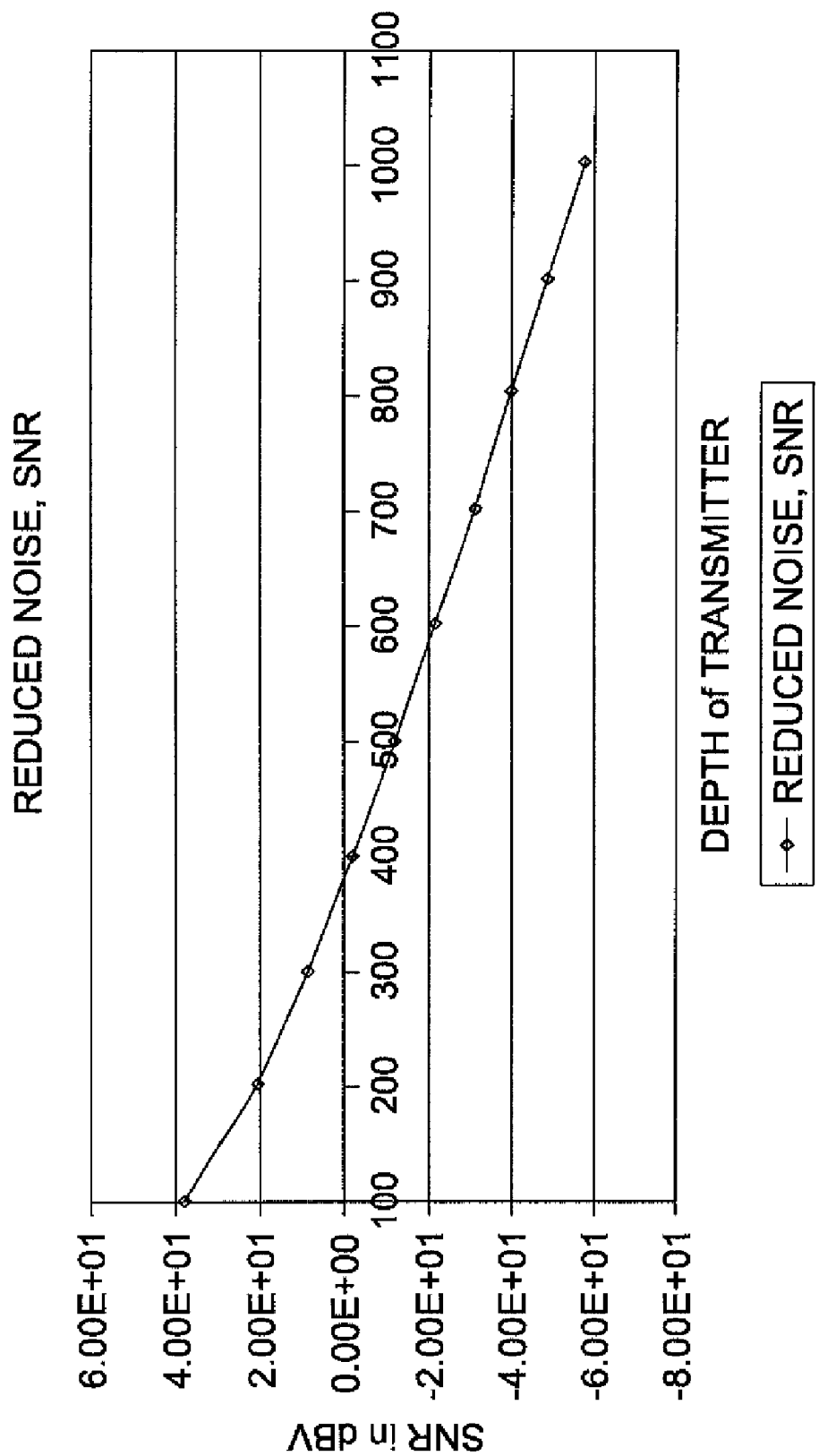

Referring now to FIG. 12, there is shown the effect of varying depth on the signal-to-noise ratio after noise reduction. The illustrated example is expected for a conductance of 0.2, an operating frequency of 100 Hz resulting in a signal-to-noise ratio of about 10 dB at 350 m, and −10 at about 425 m. Again, a noise bandwidth of 60 Hz and 20 dB of noise reduction are used. This figure shows the increased range that lowering the transmitting frequency provides. Lowering the frequency from 1,000 Hz. (FIG. 11) to 100 Hz provides an additional 100 meters of operating depth at the same signal-to-noise ratio (SNR).

Figure 13:
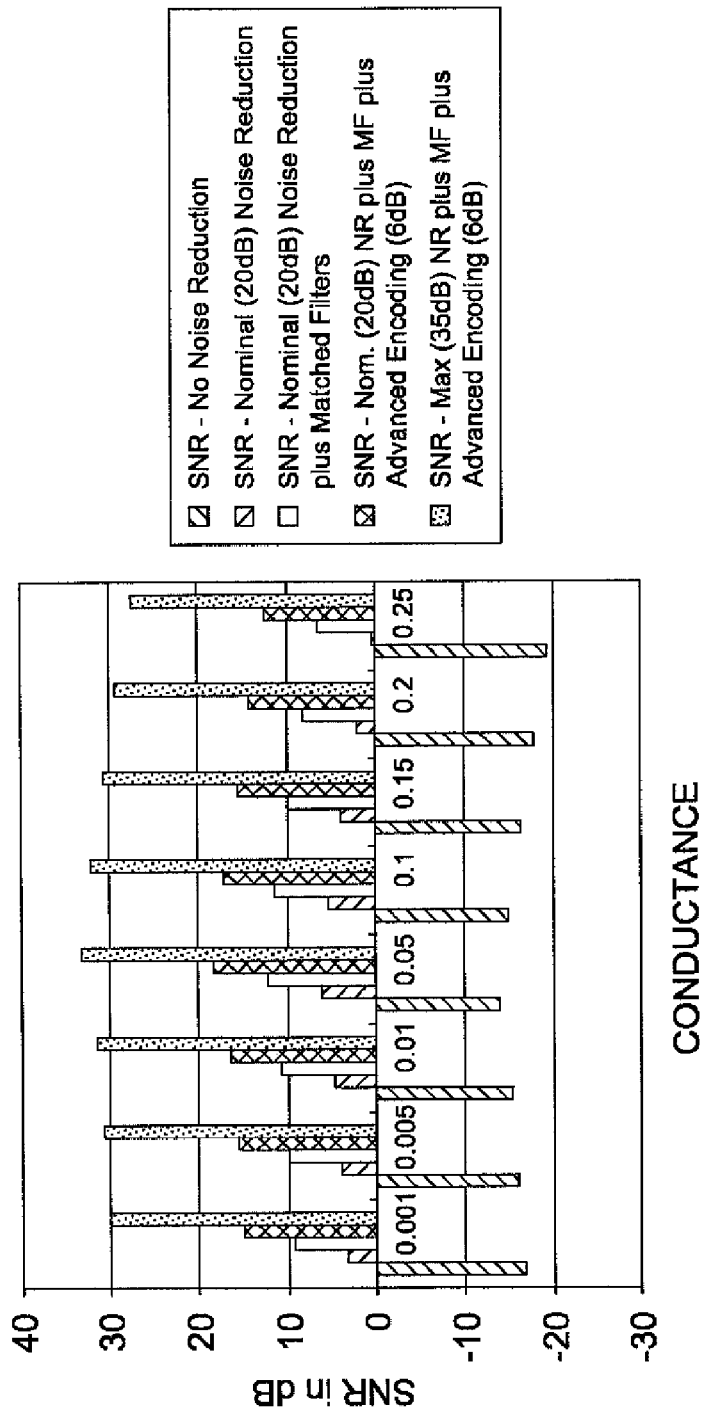

Referring now to FIG. 13 there is shown the effects of varying amounts of noise cancellation, the increased signal-to-noise ratio (SNR) due to using matched filtering, and the increased SNR due to using advanced data encoding methods. The illustrated example is expected for a conductance of 0.25, an operating frequency of 90 Hz, a data rate of 10 bps, and a noise bandwidth of 40 Hz. A nominal (20 dB) NR of noise reduction plus Matched Filtering produces a communications signal with a SNR of about 6.4 dB on the surface with the signal source (FIG. 2) at a depth of 400 meters.

Figure 14:
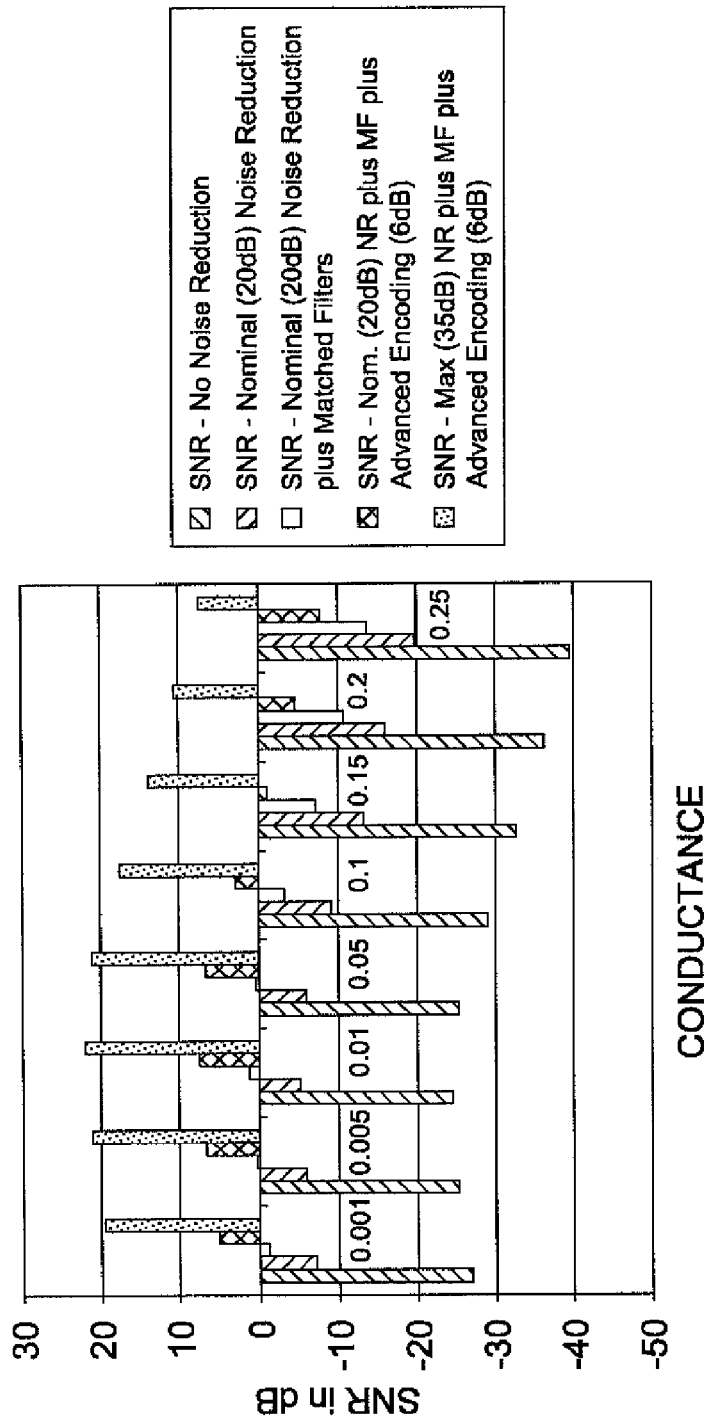

Referring now to FIG. 14 there is shown the effects of varying amounts of noise cancellation, the increased signal-to-noise ratio (SNR) due to using matched filtering, and the increased SNR due to using advanced data encoding methods. The illustrated example is expected for a conductance of 0.25, an operating frequency of 90 Hz, a data rate of 10 bps, and a noise bandwidth of 40 Hz. Use of advanced encoding, greater noise reduction (35 dB), and matched filtering allows transmissions from a depth of 600 meters producing 7 dB of SNR on the surface for the received signal. This illustrates a manner in which data and text can be successfully transmitted 600 meters through coal mine rock at 10 bps as shown in Table-2.

Figure 15:
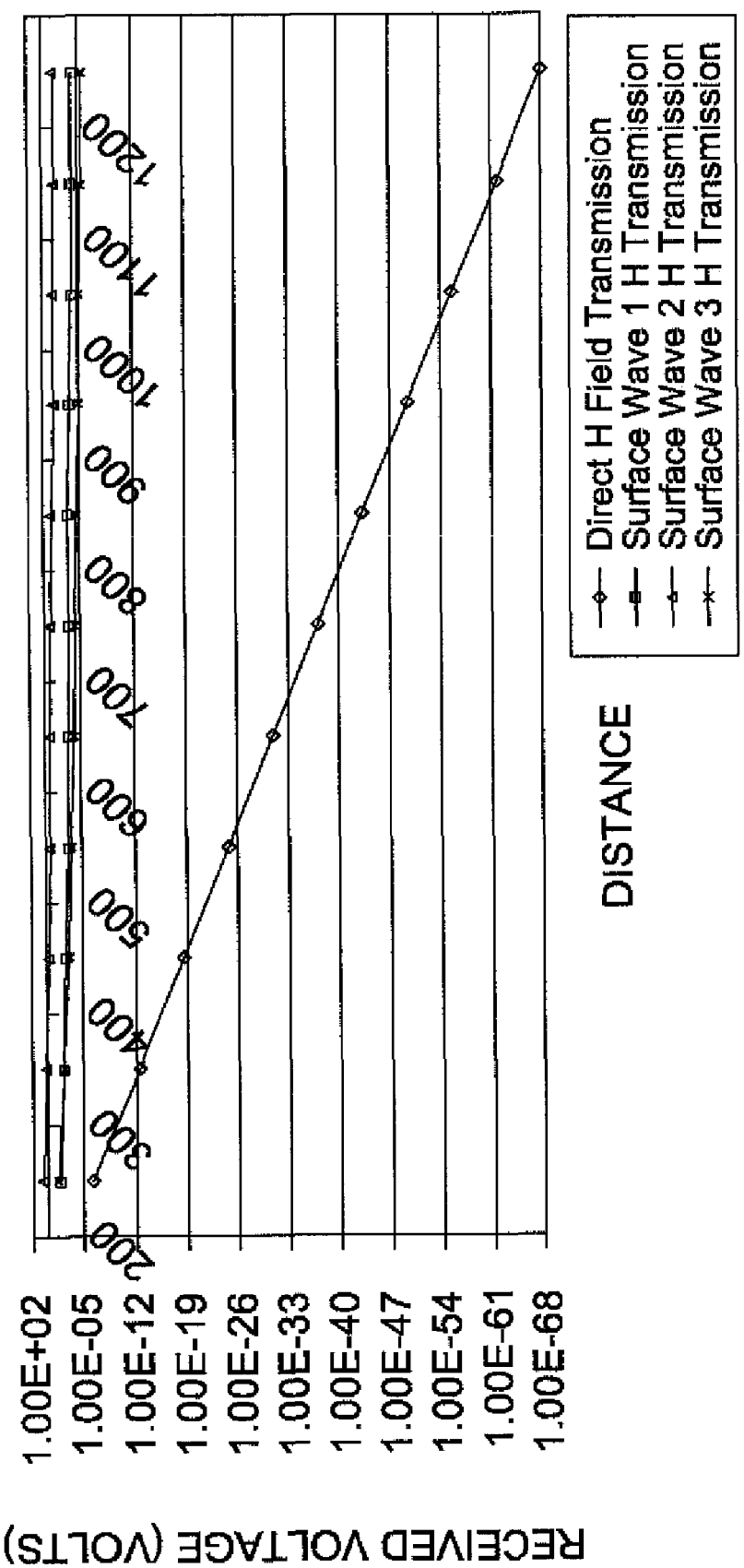

Referring now to FIG. 15, there is shown an expected transmission receive voltage versus distance of an analogous transmit loop and receiver as those discussed with regard to FIGS. 1-3 at a depth of 20 m in saltwater with a center frequency of 1000 Hz. It may be noted that expected improvements to signal strength may result from a surface wave effect, where magnetic fields that go up, over and then down to the receiver are less attenuated than direct fields.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A communications system comprising:
a plurality of sub-surface portable transceivers each including: a digital data source, a modulator coupled to the digital data source, a power amplifier coupled to the modulator and a loop antenna inductively coupled to the power amplifier; and,
a base transceiver including: an electrically insulated ferrite core antenna for receiving magnetic signals, an electric di-pole antenna for receiving ambient noise, a noise canceller coupled to the insulated ferrite core antenna and electric dipole antenna and responsive to the electric-dipole antenna to filter noise from signals received via the insulated ferrite core antenna,
wherein the noise canceller is configured to determine the electric component of the received ambient noise from the electric-dipole antenna representative of the magnetic component of the electromagnetic noise received from the insulated ferrite core antenna and cancel the noise from the signal received by the insulated ferrite core antenna, and
a demodulator coupled to the noise canceller and a decoder coupled to the demodulator.

2. The system of claim 1, wherein the portable transceiver is housed in a carrying case.

3. The system of claim 1, wherein the portable transceiver further includes a transformer coupled between the amplifier and the loop antenna.

4. The system of claim 3, wherein the transformer is a voltage step-down transformer.

5. The system of claim 1, wherein the loop antenna of the transmitter includes between 2 and 5 loops of a conductive wire.

6. The system of claim 1, wherein the amplifier is an audio amplifier.

7. The system of claim 1, wherein the modulator is a frequency shift key modulator.

8. The system of claim 1, wherein the transmitter transmits and the receiver receives magnetic field signals having a central frequency between about 90 Hz and 3000 Hz.

9. The system of claim 1, wherein each portable transceiver further comprises an inertial navigation unit.

10. The system of claim 1, wherein the digital data source of each portable transceiver comprises a controller, display and keyboard.

11. The system of claim 10, wherein the controller includes an encoder for encoding digital data for transmission to the base transceiver.

12. The system of claim 11, wherein the encoder comprises one of a multi-carrier modulation and convolutional coding encoder.

13. The system of claim 10, wherein the digital data source of each portable transceiver further comprises a microphone and a speaker.

14. The system of claim 1, wherein the sub-surface portable transceivers are underground portable.

15. The system of claim 1, wherein the portable transceiver comprises a handheld portable transceiver.

16. The system of claim 1, wherein the base transceiver comprises a portable base transceiver.

17. A method for receiving radio communications from an underground location comprising:

generating a first signal indicative of a received magnetic component of electromagnetic radiation representing both the radio communications and ambient electromagnetic noise;

generating a second signal indicative of a received electric component of electromagnetic radiation representing only the ambient electromagnetic noise;

filtering the first signal dependently upon the second signal, wherein the filtering generates a third signal substantially indicative of only the radio communications; and, demodulating the third signal.

18. The method of claim 17, wherein the demodulating comprises frequency shift key (FSK) demodulating.

* * * * *